United States Patent [19]

Kast et al.

[11] 3,896,128

[45] July 22, 1975

[54] LACTONES OF THE DIAZAXANTHENE SERIES AND DYE PRECURSORS FOR COPYING PROCESSES

[75] Inventors: Hellmut Kast, Bobenheim-Roxheim; Guenter Dunkelmann, Ludwigshafen, both of Germany

[73] Assignee: Badische Anilin- & Soda-Fabrik Aktiengesellschaft, Ludwigshafen (Rhine), Germany

[22] Filed: Aug. 29, 1973

[21] Appl. No.: 392,745

[30] Foreign Application Priority Data

Sept. 5, 1972 Germany.............................. 2243483

[52] U.S. Cl.......... 260/256.4 F; 117/36.8; 117/152; 260/247.2 B; 260/256.4 C

[51] Int. Cl............................................. C07d 51/42
[58] Field of Search................ 260/256.4 F, 247.2 B

[56] References Cited
OTHER PUBLICATIONS

Kimura, et al., "Chemical Abstracts," Vol. 72 (1970), Col. 121523t.

*Primary Examiner*—Donald G. Daus
*Assistant Examiner*—James H. Turnipseed
*Attorney, Agent, or Firm*—Johnston, Keil, Thompson & Shurtleff

[57] ABSTRACT

Lactones of the diazaxanthene series, their manufacture and their use as dye precursors in pressure-sensitive recording materials.

5 Claims, No Drawings

LACTONES OF THE DIAZAXANTHENE SERIES AND DYE PRECURSORS FOR COPYING PROCESSES

This invention relates to lactones of the diazanthene series of formula I:

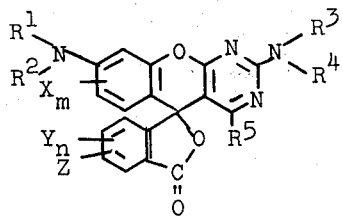

(I)

in which $R^1$, $R^2$, $R^3$ and $R^4$ denote hydrogen, alkyl, cyanoalkyl and hydroxyalkyl having $C_{1-6}$ alkyl radicals, alkoxyalkyl of from 2 to 12 carbons, carboalkoxyalkyl of from 4 to 11 carbons and phenylalkyl of from 7 to 12 carbons, and in which the pairs $R^1$, $R^2$, and $R^3$, $R^4$ may each be joined together to form a ring, and $R^5$, X, and Y denote hydrogen, hydroxy, chlorine and alkyl of from 1 to 3 carbons, Z denotes hydrogen, chlorine, nitro, alkyl, hydroxyalkyl and haloalkyl having $C_{1-3}$ alkyl radicals and m and n each denote integers of from 0 to 3 inclusive.

The lactones of formula I are colorless compounds. When used as such or dissolved in non-polar or weakly polar solvents such as hydrocarbons, chlorohydrocarbons or esters, these compounds give the corresponding deeply colored dye salts when reacted with acid substances to open the lactone ring. Since this reaction may be caused by substances such as kaolin, zeolites, bentonite, silicic acid and phenolic condensation products such as are used for coating papers or for incorporation therein, the present lactones lend themselves admirably as dye precursors in pressure-sensitive recording materials and are particularly suitable for the manufacture of copying papers. The shade produced is mainly in the red region. The dye-producing reaction occurs instantaneously and in full intensity on contact of the lactones with acid-reacting substances, and the color produced is distinguished by its very high strength and brightness.

The preferred new compounds of formula I have the following radicals:

$R^1$ and $R^2$: methyl, ethyl, propyl, butyl, β-hydroxyethyl, β-hydroxypropyl, β-carbomethoxyethyl or β-carboethoxyethyl;

$R^3$ and $R^4$: methyl, ethyl, propyl, butyl, β-hydroxyethyl or β-hydroxypropyl; or $R^3$ and $R^4$ may form, together with the adjacent N atom, a heterocyclic radical which may be a morpholino, piperidino, piperazino or pyrrolidino radical;

$R^5$: methyl;

X: hydrogen, methyl, ethyl, propyl or chlorine;

Y: hydrogen or chlorine;

Z: methyl, ethyl or trifluoromethyl.

Of particular commercial importance as dye precursors are lactones of formula I in which $R^1$, $R^2$, $R^3$, $R^4$ and $R^5$ each stands for methyl and/or ethyl and X, Y and Z each stands for hydrogen.

The diazaxanthene lactones of formula I may be produced by condensation of benzoylbenzoic acids of formula II:

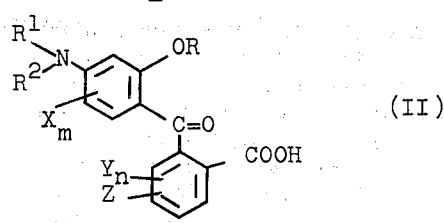

(II)

in which R denotes hydrogen, lower alkyl or aryl, with pyrimidines of formula III:

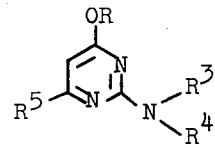

(III)

in known manner. Conveniently, this condensation is carried out in the presence of water-eliminating substances such as sulfuric acid, polyphosphoric acid, acetic anhydride or zinc chloride, at elevated temperatures of, say, from 60° to 160°C and optionally in the presence of a high-boiling solvent such as trichlorobenzene. The reaction is usually complete after from 2 to 4 hours. For the purpose of working up the reaction mixture in a cooled state, it may be added to a dilute aqueous alkali metal or ammonium hydroxide solution, from which the insoluble reaction product may be separated and then, for example, by precipitation or recrystallization, recovered in a pure state.

The resulting lactones may be used as dye precursors in copying processes in known manner. For example, they may be worked into a paste which is then coated onto paper and overcoated with a protective layer. A particularly advantageous method is to dissolve the dye precursors in a non-volatile or sparingly volatile solvent such as chloroparaffin, trichlorodiphenyl and mono-substituted or poly-substituted alkylphenols, and to enclose the solution in microcapsules and coat paper with the said microcapsules. When caused to contact an acid-reacting layer by a writing operation, the microcapsules rupture to give the desired written character.

In the following Examples, the parts and percentages are by weight.

EXAMPLE 1

313 parts of 2-(4'-diethylamino-2'-hydroxybenzoyl)-benzoic acid and 181 parts of 2-diethylamino-4-hydroxy-6-methylpyrimidine are heated under reflux for 4 hours in 1,000 parts of acetic anhydride. On cooling, the reaction mixture is poured onto ice and neutralized with caustic soda. The precipitated substance is filtered off, washed with water and dried. The resulting crude product is recrystallized from a mixture of cyclohexane and activated charcoal to give 374 parts of the compound of the formula having a melting point of from 176° to 177°C.

A solution of this compound in dodecylbenzene is enclosed in microcapsules, which are then coated onto the surface of paper. When caused to contact an acid-reacting layer by a writing operation, the capsules are ruptured and their contents react with said acid-reacting layer to give a bluish-red character.

Examples 2 to 12 are repetitions of Example 1, using different starting materials as listed in the following Table. The dye precursors thus formed give written characters having the shades stated when caused to reacted with acid-reacting substances by a writing operation.

TABLE

| Ex. | Benzylbenzoic acid component | Pyrimidine component | Shade |
|---|---|---|---|
| 2 | 2-(4'-diethylamino-2'-hydroxybenzoyl)benzoic acid | 2-dimethylamino-4-hydroxy-6-methyl-pyrimidine | bluish red |
| 3 | " | 2-morpholino-4-hydroxy-6-methyl-pyrimidine | bluish red |
| 4 | " | 2-piperidino-4-hydroxy-6-methyl-pyrimidine | bluish red |
| 5 | " | N-methylpiperazino-4-hydroxy-6-methyl-pyrimidine | bluish red |
| 6 | " | 2-dipropylamino-4-hydroxy-6-methyl-pyrimidine | bluish red |
| 7 | 2-(4'-diethylamino-2'-hydroxybenzoyl)benzoic acid | 2-di-n-butylamino-4-hydroxy-6-methyl-pyrimidine | bluish red |
| 8 | " | 2-diethylamino-4-hydroxy-pyrimidine | red |
| 9 | 2-(4'-dimethylamino-2'-hydroxybenzoyl)benzoic acid | 2-diethylamino-4-hydroxy-6-methyl-pyrimidine | yellowish red |
| 10 | " | 2-dimethylamino-4-hydroxy-6-methyl-pyrimidine | yellowish red |
| 11 | 2-(4'-ethylamino-5'-methyl-2'-hydroxybenzoyl)-benzoic acid | 2-piperidino-4-hydroxy-6-methyl-pyrimidine | scarlet |
| 12 | 2-(4'-diethylamino-2'-hydroxybenzoyl)-benzoic acid | 2-pyrrolidino-4-hydroxy-6-methyl-pyrimidine | yellowish red |

EXAMPLE 13

313 parts of 2-(4'-diethylamino-2'-hydroxybenzoyl)-benzoic acid and 153 parts of 2-dimethylamino-4-hydroxy-6-methyl-pyrimidine are heated for 6 hours at from 80° to 90°C in 1,500 parts of concentrated sulfuric acid. The reaction mixture is then added to a mixture of ice water and sodium carbonate solution with stirring, and the mixture is then shaken with chloroform.

The chloroform is evaporated and the residue is recrystallized from a 1:3 mixture of benzene and petroleum ether mixed with activated charcoal. There are obtained 342 parts of a compound of the formula

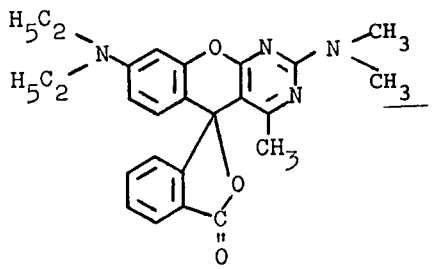

having a melting point of from 181° to 183°C (with decomposition).

When a solution of this compound in toluene or diisopropylbenzene is applied to an acid-reacting substrate, an intense red coloration is instantaneously formed.

We claim:
1. A diazaxanthene of the formula

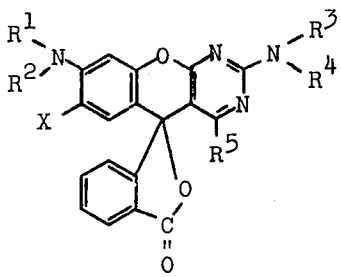

wherein $R^1$ and $R^2$ denote hydrogen or alkyl of from 1 to 4 carbon atoms, $R^3$ and $R^4$ each denote alkyl having 1 to 4 carbon atoms or the group $$-N\begin{matrix}R^3\\R^4\end{matrix}$$

denotes a five- or six-membered saturated heterocyclic ring which may contain a further N— as a member of the ring, and $R^5$ and X each denote hydrogen or methyl.

2. A diazaxanthene as set forth in claim 1 wherein $R^1$, $R^2$, $R^3$ and $R^4$ each denote methyl or ethyl and $R^5$ is methyl.

3. A diazaxanthene as set forth in claim 1 wherein $R^1$ and $R^2$ are each ethyl, $R^3$ and $R^4$ are each butyl and $R^5$ is methyl.

4. A diazaxanthene of the formula

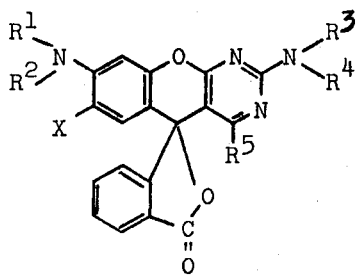

wherein $R^1$ and $R^2$ each denote hydrogen, methyl or ethyl, $R^3$ and $R^4$ each denote methyl, ethyl, propyl, or butyl, or the group
denotes piperidine, pyrazine or imidazolidine, and $R^5$ and X denote hydrogen or methyl.
5. Diazaxanthenes of the formula:
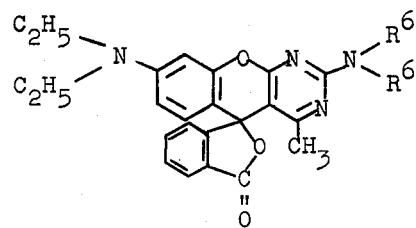
in which $R^6$ stand for ethyl, propyl or butyl.
* * * * *